Patented May 3, 1949

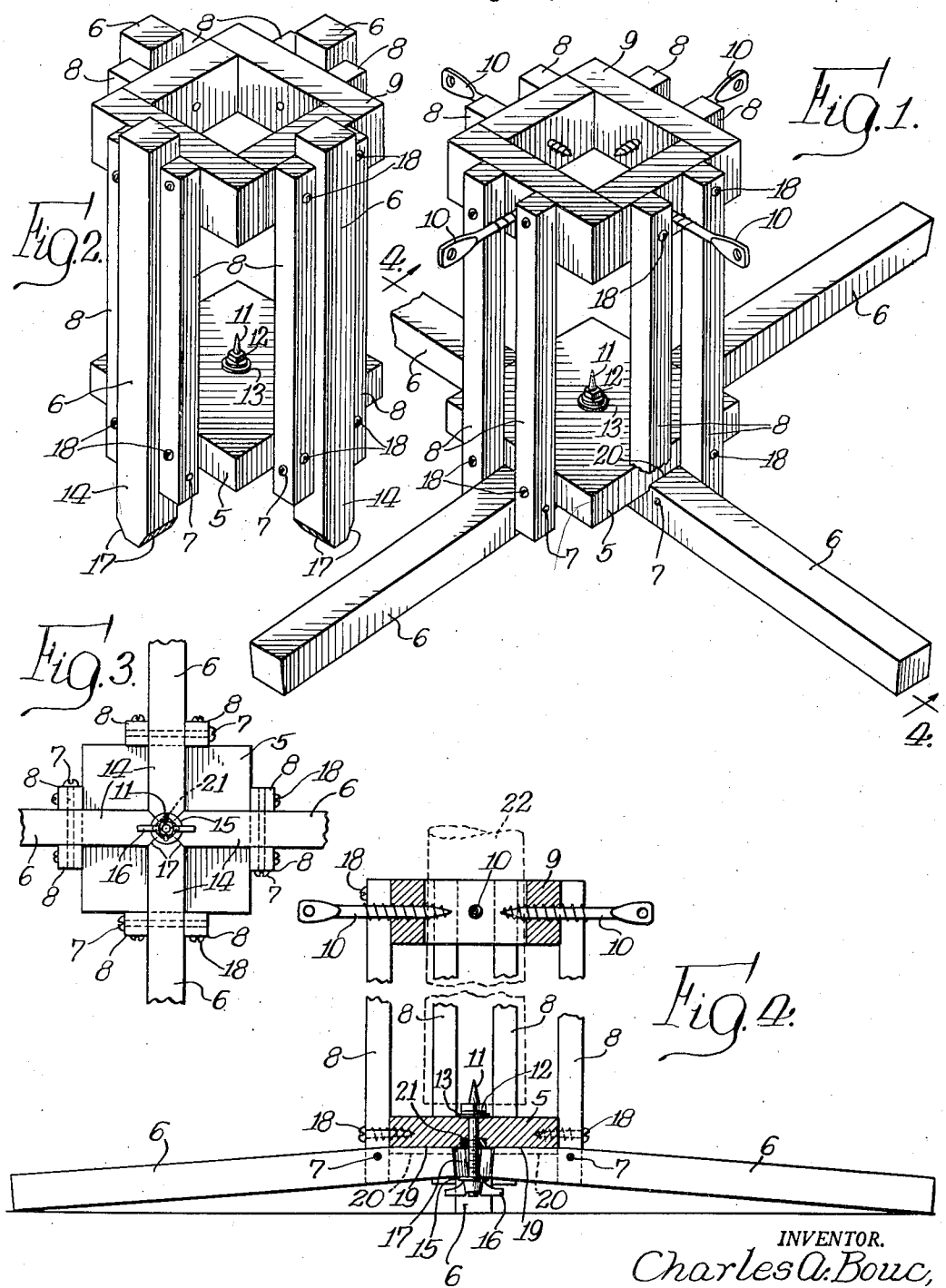

2,469,192

UNITED STATES PATENT OFFICE 2,469,192

TREE HOLDER

Charles A. Bouc, Chicago, Ill.

Application August 26, 1947, Serial No. 770,677

3 Claims. (Cl. 248—46)

This invention relates to an improved holder for elongated objects and more particularly to a device for mounting and retaining Christmas trees and other elongated objects in upright vertical position.

One object of the invention is to provide a holder of the above type which possesses a high degree of stability, is readily folded to a compact condition for storage, and is economical to construct.

Another object of the invention is to provide a holder of the above type in which the tree-receiving socket is maintained in elevated position above the floor level by means of a plurality of retractable legs.

A further object of the invention is to provide a novel means for clamping the legs of a holder of the above type in extended tree-supporting position.

Other objects and advantages of the invention will become apparent by reference to the drawing and the accompanying description thereof.

Fig. 1 is a perspective view, with portions broken away, of one form of the device showing the legs in extended position.

Fig. 2 is a perspective view of the holder showing the legs in folded or retracted position.

Fig. 3 is a fragmentary plan view of the bottom of the device showing the legs in extended position.

Fig. 4 is a sectional view taken along the line 4—4 of Fig. 1 and having portions thereof in elevation. In this view, the dotted lines indicate the outline of a tree trunk being held in upright position.

The holder comprises generally a tree-receiving socket member, a plurality of elongated legs adapted to swing outwardly from a retracted position to an extended socket member-supporting position, an impaling spike extending upwardly through the bottom of the socket member, and a clamping means engaging the opposite end of said spike for releasably retaining the legs in extended position. The socket member is preferably prismatic in shape and may be formed from a polygonal base, a correspondingly polygonal upper frame having a central opening therein, and elongated side braces secured at their opposite ends to said base and said frame.

In the form of the device shown in the drawing for illustrative purposes, the socket member has a rectangular base portion 5 and a rectangular upper frame 9 having a central opening therein for receiving a Christmas tree or other elongated object. A pair of elongated, laterally spaced side braces 8 is affixed to said frame 9 and said base 5 at each of their four edges as by screws 18. A centering or aligning screw 10 projects inwardly from each side of the rectangular frame 9 and is movable inwardly and outwardly for engaging and vertically aligning the trunk of a tree 22 as shown more clearly in Fig. 4.

An elongated leg 6 is provided at each side of the rectangular base 5 and is pivotally or swingably secured, as by a pivot pin 7, between adjacent members of each pair of side braces 8 at the lower ends of the latter which extend downwardly below the base 5. In retracted or folded position, the legs 6 are disposed vertically between the adjacent members of each pair of side braces 8, as shown clearly in Fig. 2, and the entire folded assembly is not substantially larger than the socket member itself thereby facilitating ease and convenience in storing the device. When it is desired to employ the device for supporting a tree or other elongated object, the legs 6 are swung outwardly to the radially extended position shown particularly in Fig. 1. The resultant relatively wide spread of the legs 6 imparts a high degree of stability to the holder. When the legs 6 are moved into extended socket member-supporting position, the end portions 14 of the legs 6 swing inwardly beneath the under surface of the base 5 and are received by slotted portions or recesses 20 in the under surface of the base member 5. The upper surfaces of the inner ends 14 of the legs 6 are slanted or tapered slightly as shown at 19 in Fig. 4 in order to impart an outwardly and downwardly slanting position to the legs 6 whereby the base member 5 is maintained in an elevated position above the floor level and the legs 6 contact the floor level only at their outer ends. Obviously, the slanting effect could also be obtained by providing appropriately slanted recesses in the under surface of the base 5 instead of tapering the inner ends of the legs 6 as shown at 19. In other words, the abutting surfaces of the base member 5 and the inner ends 14 of the legs 6 are arranged to co-act to provide the desired degree of slanting. This slanting arrangement of the legs 6 serves to provide the necessary clearance above the floor level for the clamping means, hereinafter described, and also imparts a certain amount of "spring" or resiliency to the legs thereby facilitating alignment of the device on uneven surfaces.

A threaded spike 11 for impaling a tree or other elongated object is mounted vertically and centrally in the base 5 by means of an upper retaining nut 12, washers 13, and a lower retaining nut 21 fitted into an appropriate recess in the under surface of the base 5. The threaded shank or stem of the spike 11 extends downwardly below the base 5 and engages a threaded clamping member such as wing nut 16. The inner ends 14 of the legs 6 are chamfered or beveled at the corners as shown at 17 in order to permit all of the ends 14 of the legs 6 to be received in abutting relationship and to nest closely about the downwardly extending shank of the spike 11 as seen more clearly in Fig. 3. A retaining washer 15 is mounted on the threaded lower end of the spike 11 and is adapted to overlie the extended inner ends 14 of the legs 6, the latter thereby being releasably held by means of the wing nut 16 in clamped position in the recesses 20 provided in the under surface of the base 5.

Although the socket member has been shown in this embodiment of the invention as rectangular in cross section, it will be apparent that other prismatic forms may also be employed; for example, the base member 5 and the upper frame 9 could be constructed in triangular, pentagonal, hexagonal, etc., shape. For convenience in storage, the aligning screws 10 are shown as having holes in their outer ends permitting the screws to be placed over the extended threaded shank of the spike 11 and retained thereon by means of the washer 15 and the wing nut 16 when the legs 6 are folded upwardly for storage.

Although only one specific embodiment of the invention has been illustrated in the drawing and described in the specification, it should be understood that various modifications and equivalents may be substituted without departing from the scope of the invention.

I claim:

1. A holder for elongated objects such as trees, comprising a socket member adapted to receive an elongated object, said socket member having a polygonal base portion and a plurality of laterally spaced, elongated side members secured to the peripheral edges of said polygonal base portion and extending upwardly therefrom; a spike having its pointed end extending upwardly through said base portion for impaling said object and having its opposite end extending below said base portion, a plurality of legs pivotally mounted adjacent the peripheral edges of said polygonal base portion and adapted to project outwardly in extended socket-member supporting position and swingable upwardly to a retracted substantially vertical position, each of said legs being disposed between adjacent side members when in said retracted position and said legs also having end portions projecting inwardly below said base portion adjacent said opposite end of said spike when said legs are in said extended socket-member supporting position, and clamping means engaging said opposite end of said spike for releasably retaining said end portions against the under surface of said base portion.

2. A holder for elongated objects such as trees, comprising a base, a frame having a central opening to receive an elongated object, a plurality of side members rigidly secured at their upper ends to said frame and at their lower ends to the peripheral edges of said base and having portions extending downwardly below said base, a spike having its pointed end extending upwardly through said base for impaling said elongated object and having its opposite end extending below said base, a plurality of legs pivotally secured to said side members at the downwardly extending portions of the latter, said legs being adapted to project outwardly from said base when in extended position and to fold upwardly adjacent said side members when in retracted position, said legs also having end portions projecting inwardly below said base when the legs are in extended position, and clamping means operatively engaging said opposite end of said spike for releasably retaining said end portions of said legs against the under surface of said base.

3. A tree holder comprising a base having recessed portions in its under surface, a frame having a central opening therein to receive a tree, a plurality of centering screws projecting inwardly from said frame for engaging and vertically aligning said tree, side members secured at their upper ends to said frame and at their lower ends to the peripheral edges of said base and having portions extending downwardly below said base, a threaded spike mounted centrally in said base and having its pointed end projecting upwardly through said base for impaling said tree and having its threaded end extending downwardly below said base, a plurality of elongated legs swingably secured to the downwardly extending portions of said side members, said legs being swingable to an extended position in which the legs project outwardly from said base and foldable upwardly to a retracted position in which said legs are disposed adjacent said side members, said legs also having end portions provided with beveled corners and adapted to project inwardly below said base adjacent said threaded end of said spike when said legs are in extended position and said end portions also being provided with tapered upper surfaces receivable in said recessed portions of said base whereby said legs are slanted downwardly and outwardly when in extended position to maintain said base in elevated position above the floor level, and clamping means including a nut engaging said threaded end of said spike for releasably retaining said end portions of said legs against the recessed under surface of said base.

CHARLES A. BOUC.

REFERENCES CITED

The following references are of record in the file of this patent:

UNITED STATES PATENTS

| Number | Name | Date |
|---|---|---|
| 594,491 | Silverman | Nov. 30, 1897 |
| 672,705 | Halladay | Apr. 23, 1901 |
| 1,721,980 | Wardell | July 23, 1929 |
| 2,159,760 | Fitzgerald | May 23, 1939 |